United States Patent
Dawson et al.

(10) Patent No.: US 9,312,544 B2
(45) Date of Patent: Apr. 12, 2016

(54) FUEL CELLS

(75) Inventors: Richard Dawson, Surrey (GB); Hugh Liam Sutherland, Hampshire (GB); Gene Stacey Lewis, London (GB); Christopher Reynolds, Surrey (GB)

(73) Assignee: AFC Energy plc (GB)

( * ) Notice: Subject to any disclaimer, the term of this patent is extended or adjusted under 35 U.S.C. 154(b) by 131 days.

(21) Appl. No.: 13/983,514

(22) PCT Filed: Jan. 18, 2012

(86) PCT No.: PCT/GB2012/050107
§ 371 (c)(1),
(2), (4) Date: Aug. 2, 2013

(87) PCT Pub. No.: WO2012/104599
PCT Pub. Date: Aug. 9, 2012

(65) Prior Publication Data
US 2014/0030630 A1    Jan. 30, 2014

(30) Foreign Application Priority Data

Feb. 4, 2011 (GB) .................................. 1101933.8
Nov. 9, 2011 (GB) .................................. 1119341.4

(51) Int. Cl.
*H01M 4/86* (2006.01)
*H01M 4/88* (2006.01)
*H01M 4/92* (2006.01)
(Continued)

(52) U.S. Cl.
CPC .......... *H01M 4/8626* (2013.01); *H01M 4/8657* (2013.01); *H01M 4/8668* (2013.01); *H01M 4/88* (2013.01); *H01M 4/8828* (2013.01); *H01M 4/921* (2013.01); *H01M 4/926* (2013.01); *H01M 8/0206* (2013.01); *H01M 8/0247* (2013.01); *H01M 8/083* (2013.01); *Y02E 60/50* (2013.01)

(58) Field of Classification Search
CPC ............ H01M 4/8626; H01M 4/8657; H01M 4/8668; H01M 4/921
See application file for complete search history.

(56) References Cited

U.S. PATENT DOCUMENTS 3,215,562 A   11/1965   Hindin
4,585,711 A    4/1986   Vaidyanathan
(Continued)

FOREIGN PATENT DOCUMENTS

GB    1317790 A    5/1973
GB    1443354      7/1976
(Continued)

OTHER PUBLICATIONS

United Kingdom Search Report for GB Application GB1101933.8 dated Apr. 13, 2011.
(Continued)

*Primary Examiner* — Stewart Fraser
(74) *Attorney, Agent, or Firm* — Tumey L.L.P.

(57) ABSTRACT

A liquid electrolyte fuel cell comprises means to define an electrolyte chamber (208), and two electrodes (10), one on either side of the electrolyte chamber (208), each electrode comprising:—a sheet (11) of metal through which are defined a multiplicity of through-holes (14), and—a gas-permeable layer (16) of fibrous and/or particulate electrically-conductive material which is bonded to and in electrical contact with the sheet of metal (11), and which comprises catalytic material (18). The electrode (10) may be arranged such that the gas-permeable layer (16) faces the electrolyte chamber (208).

13 Claims, 2 Drawing Sheets

Figure 1:
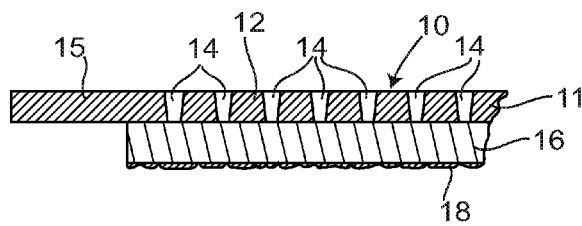

(51) Int. Cl.
*H01M 8/02* (2006.01)
*H01M 8/08* (2006.01)

(56) References Cited

U.S. PATENT DOCUMENTS

| | | | |
|---|---|---|---|
| 6,080,357 A | 6/2000 | Sugikawa | |
| 7,488,547 B1* | 2/2009 | Iacovelli | 429/434 |
| 7,629,071 B2* | 12/2009 | Liu et al. | 429/434 |
| 8,679,701 B2* | 3/2014 | Sutherland et al. | 429/498 |
| 2010/0040935 A1 | 2/2010 | Babes-Dornea et al. | |
| 2011/0117456 A1* | 5/2011 | Kim et al. | 429/406 |
| 2012/0219880 A1* | 8/2012 | Sutherland et al. | 429/498 |

FOREIGN PATENT DOCUMENTS

| | | |
|---|---|---|
| JP | 2009099362 A | 5/2009 |
| WO | 2004113590 A2 | 12/2004 |
| WO | WO 2011/015842 A1 | 2/2011 |
| WO | 2012104599 A1 | 8/2012 |

OTHER PUBLICATIONS

Great Britain Search Report for Application No. GB1307445.5 dated Oct. 25, 2013.

PCT Search Report for PCT International Application No. PCT/GB2012/050107 dated Mar. 30, 2012.

PCT Written Opinion of the International Preliminary Examining Authority for PCT International Application No. PCT/GB2012/050107 dated Jan. 22, 2013.

PCT Written Opinion of the International Searching Authority for PCT International Application No. PCT/GB2012/050107 dated Mar. 30, 2012.

PCT Notification of Transmittal of the International Preliminary Report on Patentability for PCT International Application No. PCT/GB2012/050107 dated May 2, 2013.

* cited by examiner

FUEL CELLS

The present invention relates to liquid electrolyte fuel cells, preferably but not exclusively alkaline fuel cells, and to electrodes suitable for such fuel cells.

BACKGROUND TO THE INVENTION

Fuel cells have been identified as a relatively clean and efficient source of electrical power. Alkaline fuel cells are of particular interest because they operate at relatively low temperatures, are efficient and mechanically and electrochemically durable. Acid fuel cells and fuel cells employing other liquid electrolytes are also of interest. Such fuel cells typically comprise an electrolyte chamber separated from a fuel gas chamber (containing a fuel gas, typically hydrogen) and a further gas chamber (containing an oxidant gas, usually air). The electrolyte chamber is separated from the gas chambers using electrodes. Typical electrodes for alkaline fuel cells comprise a conductive metal mesh, typically nickel, that provides mechanical strength to the electrode. Onto the metal mesh is deposited a catalyst as a slurry or dispersion of particulate poly tetra-fluoroethylene (PTFE), activated carbon and a catalyst metal, typically platinum. Such electrodes are expensive, electrically inefficient, and may suffer from irregular distribution of catalyst. Furthermore, the nickel mesh may cause local irregularities in electric properties due to resistance at the contact points between the wires of the mesh. If the mesh extends to the edge of the electrode, this can lead to sealing problems, because a mesh allows fluid flow in the plane of the mesh.

DISCUSSION OF THE INVENTION

The electrode of the present invention addresses or mitigates one or more problems of the prior art.

Accordingly the present invention, in a first aspect, provides a liquid electrolyte fuel cell with means to define an electrolyte chamber, and comprising two electrodes, one electrode on either side of the electrolyte chamber, each electrode comprising:

a sheet of metal through which are defined a multiplicity of through-holes, and a fluid-permeable layer of fibrous and/or particulate electrically-conductive material which is bonded to the sheet of metal, in electrical contact with the sheet of metal, and which comprises catalytic material.

Typically the electrode is arranged such that the fluid-permeable layer faces the electrolyte chamber. However the electrode might instead be arranged with the fluid-permeable layer facing a gas chamber.

The electrode must comprise a catalyst to enable the electro-chemical reactions to occur between the gas and liquid phases. In some cases the material of the fluid-permeable layer may be sufficiently catalytic for this purpose, but more usually the electrode also incorporates a separate catalytic material, which may be a coating. The electrode is at least partially permeable to gas, so as to enable intimate contact between the liquid electrolyte, the catalytic material and the gas phase, with a gas/liquid interface in contact with the catalytic material.

The through-holes may be defined by etched or drilled holes, so there are discrete holes. One suitable structure is formed by laser drilling. The holes may also be formed by a chemical etching process. The thickness of the metal sheet may be between 0.1 mm and 3 mm, more preferably between 0.15 mm and 0.5 mm, for example 0.3 mm (300 µm) or 0.2 mm (200 µm); and the holes may be of width or diameter between 5 µm and 2 mm, for example typically about 20 µm or 50 µm if formed by laser drilling, or about 150 µm or 300 µm if formed by chemical etching, and spaced between 50 µm and 10 mm apart. As an alternative, a much thinner layer of metal, for example a film of thickness less than 20 µm or less than 5 µm, which may be supported on a polymer substrate, may be perforated either by laser ablation or by chemical etching; and metal then deposited by electroplating onto the perforated metal film so as to achieve the desired thickness of metal. In some cases the diameter of the hole gradually decreases through the thickness of the sheet, so the holes are slightly tapered, while in other cases the holes taper from both surfaces with longitudinally curved walls, so the minimum diameter is near the centre-plane of the metal sheet, while in yet other cases the holes are of substantially uniform diameter. In cross-section, the holes may for example be circular, oval or elliptical. Somewhat larger holes, for example up to 2 mm or 3 mm across, and which might be circular, oval or slit-shaped, might also be used.

As compared to a metal mesh it will be appreciated that the metal sheet of the present invention provides better electrical conduction, as no wire-to-wire contacts are involved; it also provides a more uniform distribution of current; and the structure is stiffer, as there are no crossing-over wires that can move relative to each other. The size and spacing of the holes is also selected to ensure satisfactory diffusion of the reactant species (gas) to and from the gas-permeable layer and so the interface. Preferably the holes are of average diameter between 30 µm and 300 µm, for example 50 µm or 200 µm, and are at a centre-to-centre separation of at least 150 µm. In any event the holes may occupy less than 50% of the area of the metal sheet, preferably less than 25% and optionally less than 10%; indeed the proportion may be less than 1%.

The fluid-permeable layer may comprise carbon nanotubes, carbon black, and a hydrophobic binder such as PTFE. Other suitable forms of carbon are graphite, graphene and activated charcoal; and potentially buckyballs and nanohorns. These types of carbon provide good electrical conductivity, while the hydrophobic binder inhibits aqueous electrolyte from passing right through the fluid-permeable layer, which may therefore be referred to as a gas-permeable layer. The fluid-permeable layer may comprise other electrically-conductive particulate materials such as nickel whiskers. The thickness of the fluid-permeable layer may be equal to at least half the separation between the holes; and indeed the thickness may be greater than or equal to the separation between the holes through the metal sheet. Hence the fluid-permeable layer is preferably at least 0.10 mm thick, but preferably less than 1 mm thick, for example between 0.1 mm and 0.8 mm thick or between 0.2 mm and 0.6 mm thick. Since the fluid-permeable layer is formed of particulate material, the pores within it are small and close together, forming a fluid-permeable network of pores throughout the layer. For example the pores would typically be of width less than 20 µm, and may be spaced apart by less than 50 µm.

In the fuel cell, the electrode may be sealed by gaskets to adjacent structural components, for example to a frame to define the electrolyte chamber. The edge of the fluid-permeable layer may also be covered by the gasket. The gasket may be stepped to enclose an edge region of the fluid-permeable layer. In any event the edge region of the fluid-permeable layer is desirably held onto the metal sheet, for example by a seal or gasket, in addition to the fluid-permeable layer being bonded onto the metal sheet.

In another aspect, the present invention provides a liquid electrolyte fuel cell with means to define an electrolyte chamber, and comprising two electrodes, one electrode on either side of the electrolyte chamber, each electrode comprising:
  a sheet of metal through which are defined a multiplicity of through-holes, and
  a fluid-permeable layer of fibrous and/or particulate electrically-conductive material which is bonded to the sheet of metal, in electrical contact with the sheet of metal, and which comprises catalytic material;
wherein the fuel cell includes a seal or gasket to hold the edge region of the fluid-permeable layer onto the metal sheet.

The metal of the metal sheet may be nickel, or may be stainless-steel; other metals that are not significantly affected by the electrolyte may also be used. In some cases it may be preferable to use a metal such as silver, gold or titanium, either to form the sheet or to provide a coating on the sheet. If the metal is a steel that contains both chromium and manganese, heat treatment of the steel may generate a chromium manganese oxide spinel coating on the surface, which is itself electrically conductive and protective to the underlying metal. Similar protective coatings may be formed on an electrode of other metals, or may be formed using known deposition techniques such as electro-deposition. The provision of a protective coating on the surface may enhance the chemical durability of the metal sheet; where no such protective layer is present, the durability of the metal sheet would be decreased. The preferred material is nickel, as this is resistant to corrosion in contact with an alkaline electrolyte for example of potassium hydroxide solution.

In a third aspect, the present invention provides an electrode comprising:
  a sheet of metal through which are defined a multiplicity of through-holes, and
  a fluid-permeable layer of fibrous and/or particulate electrically-conductive material which is bonded to the sheet of metal, in electrical contact with the sheet of metal, and which comprises catalytic material.

Such an electrode may also be incorporated into a fuel cell.

The fluid-permeable layer may be bonded to the sheet of metal by a polymer, or by a ceramic, such as an amorphous ceramic. In a further aspect the present invention provides a method of bonding a sheet of metal to a fluid-permeable layer, by coating surfaces of the sheet and of the layer with a precursor for a ceramic, and then treating the precursor so as to produce the ceramic.

Figure 2:
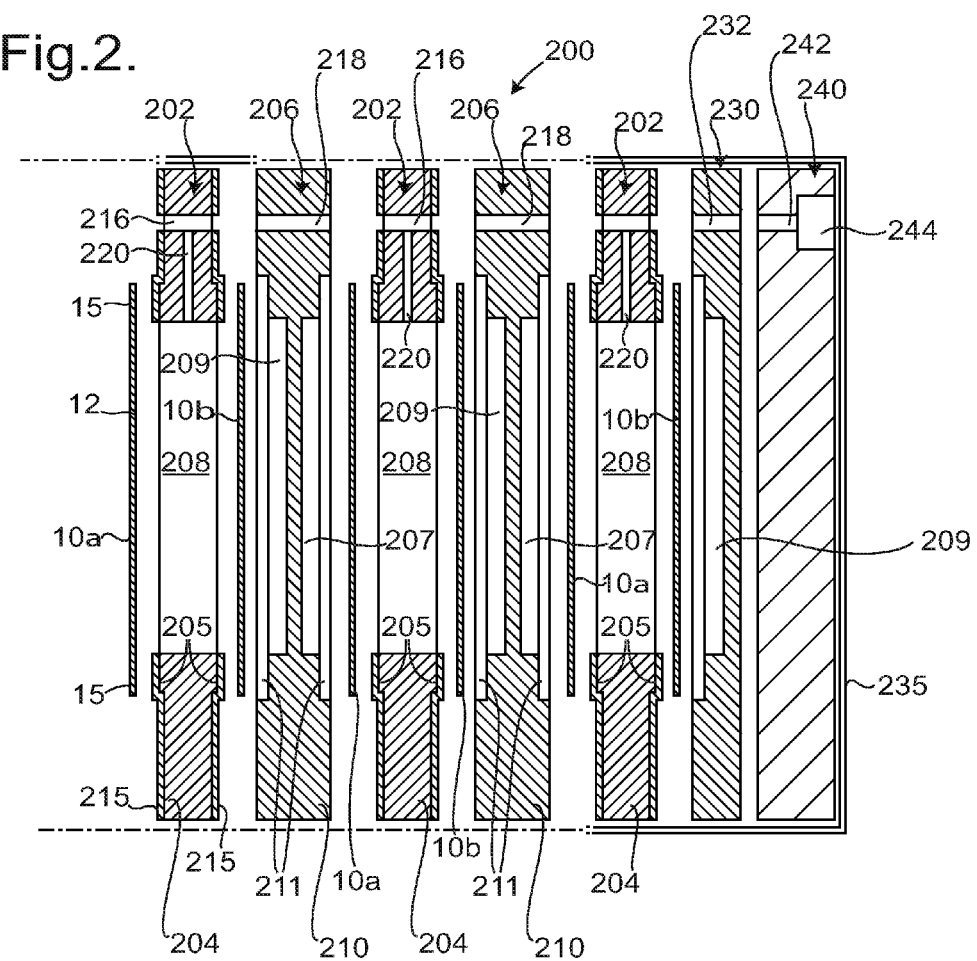
Figure 3:
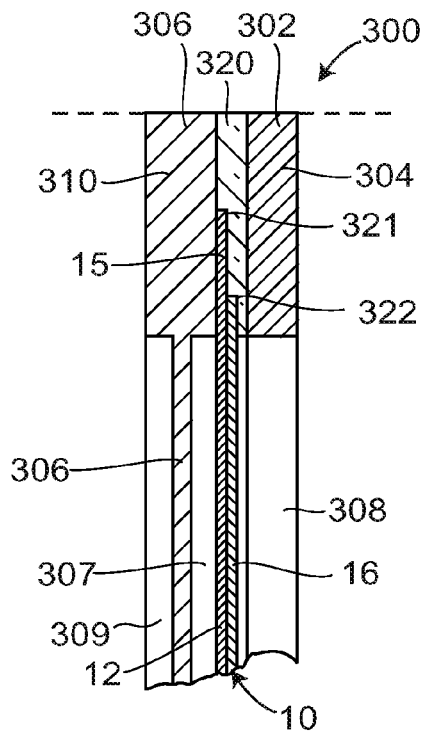
Figure 4:
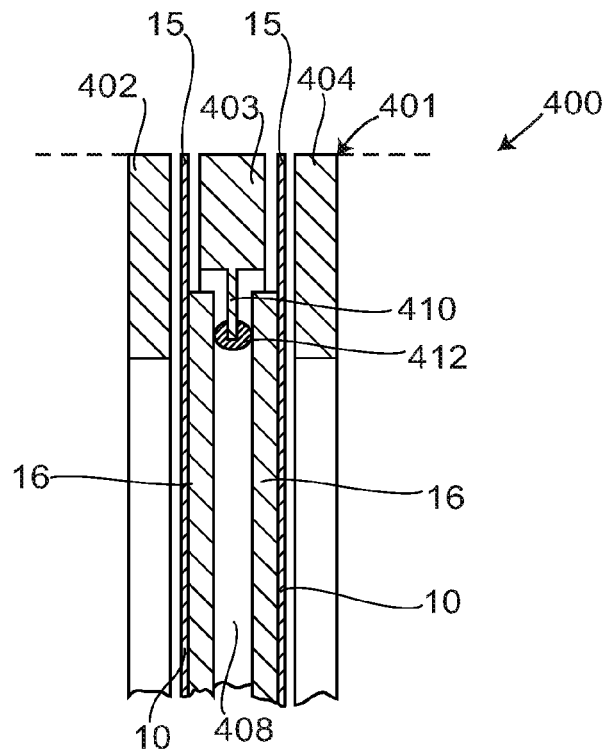

The invention will now be further and more particularly described, by way of example only, and with reference to the accompanying drawings in which:
  FIG. 1 shows a cross-sectional view through an electrode;
  FIG. 2 shows a cross-sectional view of a fuel cell stack incorporating electrodes as shown in FIG. 1; FIG. 3 shows an edge region of an electrode in a fuel cell stack to a larger scale; and
  FIG. 4 shows an edge region of an electrode in a fuel cell stack, showing an alternative sealing arrangement.

ELECTRODE STRUCTURE

Referring to FIG. 1, an electrode 10 comprises a sheet 11 of a metal such as nickel or ferritic stainless-steel. The sheet 11 is of thickness 0.3 mm. Most of the sheet—the central region 12—is perforated for example by laser drilling to produce a very large number of through holes 14, the holes each being of mean diameter 50 µm and being separated by between 150 µm and 200 µm; as a result of the laser drilling process, each hole 14 is in practice slightly tapered along its length, typically from 70 µm at the front surface, on which the laser is incident, to 30 µm at the opposite surface. A margin 15 around the periphery of the sheet 11, of width 5 mm, is not perforated. The hole dimensions and separations are given here by way of example; as an alternative the holes might be of mean diameter 300 µm and separated by between 200 µm and 800 µm; such larger holes might be made by chemical etching.

After forming the through holes 14, one surface of the perforated central region 12 is then covered in a coating to provide a gas-permeable layer 16; the exposed surface of the gas-permeable layer 16 is then coated with a coating 18 of catalytically active material. These coating processes will be described in the following paragraphs.

Firstly the sheet 11 may be treated to ensure that the surfaces within the holes 14 are hydrophobic; this is particularly applicable with laser-drilled holes 14. This uses an aqueous suspension of sub-micron sized PTFE particles, 60 wt % PTFE, containing a branched secondary alcohol ethoxylate surfactant such as the Tergitol TMN series of surfactants (Tergitol is a trade mark). For example this suspension may be DuPont Zonyl (trade mark) PTFE TE-3887, in which the particles are of size between 0.05 and 0.5 µm and of average size 0.2 µm. This suspension is diluted with water to 4.5 wt % PTFE, and a cloth is soaked with this dilute suspension. The sheet 11 is then placed on to this cloth, so that the surface that is to be covered with the gas-permeable layer 16 is the surface that touches the cloth, so that the suspension is absorbed into the holes 14 by a capillary effect. The sheet 11 is then placed on to a dry non-shedding cloth, so that any excess suspension in the holes 14 is absorbed into the cloth. The sheet 11 is then allowed to dry.

The gas-permeable layer 16 is made by first mixing carbon with alcohol. The preferred mixture includes electrically-conductive carbon black, multiwall carbon nanotubes to enhance porosity and conductivity, and activated charcoal to enhance porosity, preferably the proportion of carbon black being greater than the proportion of nanotubes. For example it may comprise 60-90 wt % carbon black with lesser proportions of nanotubes and/or activated charcoal. An alternative mixture might comprise only carbon nanotubes, but of a range of different lengths and sizes. The carbon mixture is combined with a large excess of alcohol, typically between three and eight times the mass of carbon, for example five times the mass of carbon. This may for example be isopropyl alcohol, or a longer-chain, branched or multifunctional alcohol such as butyl alcohol, pentyl alcohol, or ethylene glycol. The mixture may also contain a small proportion of an alcohol-retaining species, such as calcium acetate or poly(acrylic acid), for example at less than a fifth of the mass of carbon, more typically a tenth. This is then combined with a 60 wt % aqueous suspension of sub-micron sized PTFE particles containing Tergitol surfactant, as described above, typically between two and three times the mass of carbon, for example 2.5 times the mass of carbon. When the PTFE suspension contacts the alcohol, it gels, so the mixture has a dough-like consistency.

In a modification, a solution of surfactant in water may be added to the carbon mixture, to form damp carbon; this is then mixed with an aqueous suspension of PTFE particles also containing surfactant; alcohol such as isopropyl alcohol is then mixed in, and the mixture gels to form a dough-like consistency. This may produce a more uniform coating of PTFE on the carbon particles.

The mixture is calendered, for example through rollers, before finally being rolled out to a thickness of 0.3 or 0.7 mm. This is then pressed on to the surface of the sheet 11, and is then heated to between 200° C. and 300° C., or between 250° C. and 300° C., and held at that temperature typically for between 30 min and 1.5 hours. An alternative heating process consists of raising the temperature to a peak value, which may be held for 1 minute, and then lowering the temperature again. The heating process leads to evaporation of any remaining alcohol, and evaporation or breakdown of the surfactant; and at least partial sintering of the PTFE particles, so that the gas-permeable layer 16 is a coherent and yet permeable hydrophobic structure and is bonded to the sheet 11. This heating process would also sinter any PTFE coating within the holes 14, ensuring that the surfaces within the holes would also be hydrophobic. In one specific embodiment the hole separation is 0.86 mm and the thickness of the gas-permeable layer is 0.56 mm.

In a modification to the composition described above, the mixture might comprise a different hydrophobic polymer, such as polyvinylidene fluoride, instead of or in addition to the PTFE.

In an alternative to the above procedure for forming the gas-permeable layer 16, two different layers may be superimposed, the layers differing in the carbon components or in their hydrophobic properties. For example a first layer may contain carbon nanotubes of a range of different lengths, and a second layer may contain carbon black as well as carbon nanotubes. The heating process would bond both the layers together, providing a gas-permeable layer 16 which is the required coherent and yet permeable hydrophobic structure but which has somewhat different electrical and hydrophobic properties through its thickness.

In the electrode 10 of FIG. 1 the gas-permeable layer 16 is shown as being in contact with the rear surface of the metal sheet 11, that is to say the surface remote from that on which the laser had been incident to form the holes 14. In an alternative arrangement, the gas-permeable layer 16 is in contact with the front surface of the metal sheet 11. The laser drilling of the sheet 11 may create a slightly rough finish around the holes 14, which enhances adhesion between the metal sheet 11 and the gas-permeable layer 16. In a further alternative the surface of the metal sheet 11 onto which the gas-permeable layer 16 is to be placed is subjected to a roughening pre-treatment before the gas-permeable layer 16 is placed on it. Such a roughening pre-treatment may provide roughness at a scale of less than 20 µm, preferably around 5 µm, and this may be achieved using a laser or by an etching process for example using a grain-boundary-specific etchant. This roughening pre-treatment also enhances adhesion between the metal sheet 11 and the gas-permeable layer 16.

In a modification to the procedure described above, particularly where the holes 14 are of width about 0.2 mm or more, it is not essential to render the inside surfaces of the holes 14 hydrophobic. In this case, after forming the holes 14 and roughening the surface, the surface may be coated with a hydrophobic polymer suspension such as the PTFE suspension described above, for example by spraying. After this has dried, the surface is then mechanically polished so that the raised parts of the metal are exposed, but that intervening regions of the metal are covered with polymer. The gas diffusion layer 16 is then applied as described above, the polymer coating on the surface of the metal sheet 11 enhancing adhesion of the gas diffusion layer 16 to the metal sheet 11, while the exposed metal ensures electrical contact with the conductive particles of the gas diffusion layer 16.

The electrode 10 may be used in either a cathode or an anode; the principal difference would be in the composition of the catalyst mixture that forms the coating 18, and indeed some catalyst compositions may be suitable in both anodes and cathodes.

By way of example, catalyst mixtures for both cathode and anode electrodes may use a combination of catalyst, binder and solvent which is spray-coated onto the surface of the gas-permeable layer 16 to form the coating 18. The binder may for example be a polyolefin (such as polyethylene) which been made tacky by heat treatment with a liquid such as a hydrocarbon (typically between C6 and C12), the liquid then acting as a dispersing agent for the catalyst particles and for the binder, and evaporating after the coating step. Percentage weights refer to the total mass of the dry materials. Some example compositions are as follows:

The cathode catalyst mixtures A to C below include an oxygen reduction catalyst.
    A. Activated carbon, with 10% binder.
    B. 10% Pd/Pt on activated carbon, with 10% binder.
    C. Silver on activated carbon, with 10% binder.

The anode catalyst mixtures D and E below include a hydrogen oxidation catalyst.
    D. Leached nickel-aluminum alloy powder with activated carbon, with 10% binder.
    E. 10% Pd/Pt on activated carbon, with 10% binder.

As an alternative, the catalyst might comprise silver particles, deposited by spraying a suspension of silver particles in a liquid, and then baking the electrode 10 so that the silver particles partly sinter together. Whatever type of catalyst is deposited as the coating 18, it is important that the exposed surface of the electrode 10 remains permeable, as liquid electrolyte must permeate the coating 18, to meet the gas that permeates through the gas-permeable layer 16, so there is a gas/electrolyte interface within the coating 18, where the catalyst is present. Furthermore it follows that the coating 18 should be at least partly hydrophilic. In a modification, before depositing the coating 18, the exposed surface of the gas-permeable layer 16 is given a surface texture, for example by rolling with a textured roller, before spraying on the catalyst-containing coating 18. The surface texture may for example provide variations in thickness of up to 50 µm. Such texturing may be beneficial where the gas-permeable layer 16 consists of two or more layers of carbon-containing material of different compositions.

Another alternative way of introducing the catalyst would be to form a thin catalyst layer by an extrusion process, as described above for forming the gas-permeable layer, and pressing such an extruded layer onto a gas-permeable layer or co-extruding the catalyst layer onto a gas-permeable layer. Screen printing would be another technique. Furthermore, as another alternative, catalyst may be incorporated into the mixture forming the gas-permeable layer.

Bonding Processes

As explained above, the gas-permeable layer 16 is bonded to the sheet 11. Adhesion between them may be enhanced by the provision of a thin polymer coating on the metal before the gas-permeable layer 16 is put into position, leaving part of the metal exposed to ensure electrical contact; so as described above the polymer bonds them together. Adhesion can also be enhanced by roughening the surface of the sheet 11, and this may be achieved using a laser, or by an etching process for example using a grain-boundary-specific etchant. Adhesion can also be enhanced by controlling the shape of the holes 14 such that the holes 14 taper along part of their length, as the gas-permeable layer 16 may then be pressed firmly onto the sheet 11 such that portions of the gas-permeable layer 16 are extruded through the tapered part of the holes 14 so as to protrude slightly beyond the narrowest part, providing a rivet-like mechanical bond onto the sheet 11. In the case of chemically etched holes, the holes may taper from both surfaces to a narrowest part near the middle of the sheet.

When the sheet 11 has a polymer coating, the surface of the sheet 11 or that of the layer 16 may be covered with a surfactant that interacts with the polymer, such as Tergitol, or with a small quantity of a polymer/surfactant suspension, before the sheet 11 and the layer 16 are assembled. This can assist in the forming of a chemical bond between the polymer on the sheet 11 and the polymer in the gas-permeable layer 16.

An alternative way of bonding the gas-permeable less 16 onto the metal sheet 11 is by forming an interfacial bond comprising an amorphous ceramic. This may be achieved by providing the surfaces of the sheet 11 and of the gas-permeable layer 16 with coatings no more than 1 μm thick of an amorphous-ceramic precursor. These coatings are preferably no more than 0.5 μm thick, and more preferably no more than 0.1 μm thick. The sheet 11 and the gas-permeable layer 16 are then assembled and pressed together, and treated so as to form the amorphous ceramic from the precursor material. In some cases this may only require drying, while in other cases heating is needed. Clearly the heating must not exceed temperatures at which the polymer in the gas-permeable layer 16 would deteriorate, so the heating is to a much lower temperature than would be used when forming a crystalline ceramic. For example it may be appropriate to heat at between 200° C. and 300° C., or between 230° C. and 270° C., for example 250° C., and to hold at that temperature for between 30 min and 1.5 hours. This leads to formation of the amorphous ceramic, bonding the materials together.

By way of example, a solution is made of about 0.085 M zirconium acetylacetonate in 50:50 methoxypropanol-denatured ethanol as solvent, with the addition of 50 drops of surfactant (e.g. Tergitol TMN6 (trade mark)) per 100 ml of solution. This is sprayed with an ultrasonically atomised spray system onto those surfaces of the metal sheet 11 and of the gas-permeable layer 16 that are to be bonded together. The solvents are allowed to evaporate, leaving an oily film of the zirconium salt and surfactant. Spraying and allowing the solvents to evaporate may be repeated two or three more times.

The sheet 11 and the layer 16 are then further dried at an elevated temperature, for example between 25° and 45° C., for at least 2.5 minutes, and then pressed together, dried at the elevated temperature for between 10 and 30 min, and then baked at 250° C. for 30 min. The pressing step may be carried out at 1.4 kN/cm$^2$=14 MPa for 10 seconds.

It is surmised that the zirconium salt forms a waxy film with the surfactant. The salt melts at about 190° C., running over the surface to some extent, and then decomposes to form amorphous zirconia in surface cracks and at the interface.

It will be appreciated that the ceramic may comprise other metal oxides, such as those of cerium, indium, tin, manganese, or cobalt, or mixtures of oxides. The precursor may be an acetylacetenoate, or an alkoxide such as a formate or acetate, or other metal-organic compounds in which organic groups are bound to a metal atom via an oxygen atom, and which can be broken down thermally. An alternative is to use a salt (such as zirconium chloride, indium chloride or tin chloride) dissolved in alcohol, as this behaves analogously to the corresponding alkoxide when heated. Another option is to use an oxide in a colloidal form, for example using flame hydrolysed zirconia or tin oxide dispersed in water, optionally with an organic binder such as polyvinyl alcohol; in this case it may be sufficient to dry the colloid to form the amorphous oxide. In each case it may be advantageous to incorporate a surfactant into the initial solution, to enhance the contact with the polymer in the gas permeable layer 16.

Cell Stack Structure

Referring now to FIG. 2, there is shown a cross-sectional view through the structural components of a cell stack 200 with the components separated for clarity. The stack 200 consists of a stack of moulded plastic plates 202 and 206 arranged alternately. Each plate 202 defines a generally rectangular through-aperture 208 surrounded by a frame 204; the apertures 208 provide electrolyte chambers, and immediately surrounding the aperture 208 is a 5 mm wide portion 205 of the frame which projects 0.5 mm above the surface of the remaining part of the frame 204. The plates 206 are bipolar plates; each defines rectangular blind recesses 207 and 209 on opposite faces, each recess being about 3 mm deep, surrounded by a frame 210 generally similar to the frame 204, but in which there is a 5 mm wide shallow recess 211 of depth 1.0 mm surrounding each recess. The blind recesses 207 and 209 provide gas chambers.

It will thus be appreciated that between one bipolar plate 206 and the next in the stack 200 (or between the last bipolar plate 206 and an end plate 230), there is an electrolyte chamber 208, with an anode 10a on one side and a cathode 10b on the opposite side; and there are gas chambers 207 and 209 at the opposite faces of the anode 10a and the cathode 10b respectively. These components constitute a single fuel cell.

Electrodes 10a and 10b locate in the shallow recesses 211 on opposite sides of each bipolar plate 206, with the catalyst-carrying face of the electrode 10a or 10b facing the adjacent electrolyte chamber 208. Before assembly of the stack components, the opposed surfaces of each frame 204 (including that of the raised portion 205) may be covered with gasket sealant 215; this adheres to the frame 204 and dries to give a non-tacky outer surface, while remaining resilient. The components are then assembled as described, so that the raised portions 205 locate in the shallow recesses 211, securing the electrodes 10a and 10b in place. The sealant 215 ensures that electrolyte in the chambers 208 cannot leak out, and that gases cannot leak in, around the edges of the electrodes 10a and 10b, and also ensures that gases cannot leak out between adjacent frames 204 and 210. The perforated central section 12 of each electrode 10 corresponds to the area of the electrolyte chamber 208 and of the gas chamber 207 or 209; the non-perforated peripheral margin 15 is sealed into the peripheral shallow recess 211; and the gas-permeable layer 16 with the catalytic coating 18 is on the face of the electrode 10 closest to the adjacent electrolyte chamber 208.

As shown in FIG. 1 the gas-permeable layer 16 extends partly onto the non-perforated margin 15; and as shown in FIG. 2 this margin 15 is sealed into the shallow recess 211 by the sealant 215. Both the margin 15 and the recess 211 are 5 mm wide, in this example, so the edge of the gas-permeable layer 16 is enclosed by the sealant 215. The edge of the gas-permeable layer 16 is therefore not directly exposed to the electrolyte, and is clamped by the sealant 215 onto the non-perforated margin 15.

It will be appreciated that this cell stack 200 is shown by way of example only, as an illustration of how the electrodes 10 of the invention may be used. Whatever the detailed arrangements of the cell stack 200 may be, in each case a single fuel cell consists of an electrolyte chamber 208 with electrodes 10a and 10b on either side which separate it from adjacent gas chambers 207 and 209. Within the stack 200 several fuel cells are arranged so as to be electrically in series, to provide a greater voltage than is available from a single cell.

The flows of fluids to the fuel cells follow respective fluid flow ducts, at least some of which are defined by aligned apertures through the plates 202 and 206. Only one such set of apertures 216 and 218 is shown, which would be suitable for carrying electrolyte to or from the electrolyte chambers 208 via narrow transverse ducts 220. The flows of the gases to and from the gas chambers (recesses 207 and 209) may similarly be along ducts defined by aligned apertures through the plates 202 and 206. In a modification, the cell stack is arranged so the aligned apertures 216 and 218 are at the bottom of the cell stack, for supplying electrolyte; and electrolyte leaves the electrolyte chambers 208 through ducts (not shown), similar to the ducts 220, but leading to the outer surface of the cell stack.

At one end of the stack 200 is a polar plate 230 which defines a blind recess 209 on one face but is blank on the outer face. Outside this is an end plate 240, which also is moulded of polymeric material, and which defines apertures 242 which align with the apertures 216 and 218 in the plates 202 and 206; at the outside face the end plate 240 also defines ports 244 communicating with the apertures and so with the fluid flow ducts through which the gases and electrolyte flow to or from the stack 200, each port 244 comprising a cylindrical recess on the outer face. At the other end of the stack 200 is another polar plate (not shown) which defines a blind recess 207. There is then another end plate (not shown) which may be blank on the outer face and not define through apertures; alternatively it may define through apertures for one or more of oxidant gas, fuel gas and electrolyte.

After assembly of the stack 200 the components may be secured together for example using a strap 235 (shown partly broken away) around the entire stack 200. Other means may also be used for securing the components, such as bolts.

Edge Clamping Options

Referring to FIG. 3 there is shown an edge portion of an electrode 10 in a fuel cell stack 300, which is a modification to the fuel cell stack 200 of FIG. 2. The fuel cell stack 300 consists of a stack of moulded plastic plates 302 and 306 arranged alternately (only one of each is shown). Each plate 302 defines a generally rectangular through-aperture 308 surrounded by a frame 304; the apertures 308 provide electrolyte chambers. The plates 306 are bipolar plates; each defines rectangular blind recesses 307 and 309 on opposite faces, each recess being about 3 mm deep, surrounded by a frame 310. The blind recesses 307 and 309 provide gas chambers.

Thus between one bipolar plate 306 and the next in the stack 300 (or between the last bipolar plate 306 and an end plate), there is an electrolyte chamber 308, with an anode 10 on one side and a cathode (not shown in FIG. 3) on the opposite side; and there are gas chambers 307 and 309 at the opposite faces of the anode 10 and the cathode respectively. These components constitute a single fuel cell.

A gasket 320 is placed between successive frames 304 and 310. The electrode 10 is placed up against the face of the frame 310, with the gas diffusion layer 16 on the side facing the electrolyte chamber 308. The gasket 320 defines two steps on the side that faces the frame 310: a first step 321 to accommodate the edge of the non-perforated margin 15, and a second step 322 to enclose and seal the edge of the gas diffusion layer 16. As in the fuel cell stack 200 of FIG. 2, the gasket 320 ensures that the edge of the gas diffusion layer 16 is not directly exposed to the liquid electrolyte.

The electrodes 10 described above each comprise a sheet of nickel or of ferritic stainless-steel, with holes 14 formed by laser drilling or etching. In a modification, where the sheet is of steel, the steel may be coated with a thin layer of nickel; this may be done before or after laser drilling holes through the stainless-steel sheet. The nickel is a good electrical conductor, and also protects the stainless steel against corrosion from the electrolyte.

In use of the electrode 10 of the invention, aqueous electrolyte such as KOH is present at the face carrying the catalytic coating 18, while gas is present at the other face. The gas permeates the gas-permeable layer 16; while the electrolyte at least partly permeates the catalytic coating 18, but not the gas-permeable layer 16 because of the hydrophobic nature of the binder PTFE. Consequently there is a gas/liquid-electrolyte interface in the vicinity of the catalyst. The gas does not bubble through the electrode into the electrolyte, as the interface is at a substantially constant position. The gas undergoes a chemical reaction in the vicinity of the coating 18. Fresh gas diffuses into the gas-permeable layer 16 from the holes 14, and any reaction products either diffuse back out through the holes 14 or are taken away by the liquid electrolyte. Although the holes 14 are spaced apart, the gas-permeable layer 16 is sufficiently thick that the gas flow reaching the coating 18 is substantially uniform over its entire area.

In a further alternative the binder within the fluid-permeable layer is hydrophilic. In this case the fluid-permeable layer may be referred to as a liquid-permeable layer. The electrode might therefore be arranged with the metal (nickel or stainless-steel) plate adjacent to the electrolyte chamber, and the liquid-permeable layer and the catalyst on the opposite side of the steel plate from the electrolyte chamber.

Referring now to FIG. 4 there is shown an alternative way of clamping the edge of the gas diffusion layer 16 onto the metal sheet 11. A fuel cell stack 400 consists of many single fuel cells 401; only one fuel cell 401 is shown. The fuel cell stack 400 consists of a stack of moulded plastic plates 402, 403 and 404 (only one of each is shown), and they are shown slightly separated. Each plate 403 defines a generally rectangular through-aperture 408, which provides an electrolyte chamber. The plates 402 and 404 define gas chambers: plate 402 defines an air chamber and plate 404 defines a fuel chamber.

The electrolyte chamber 408 is separated from the air chamber by an electrode 10 (a cathode) and is separated from the fuel chamber by another electrode 10 (an anode). These components constitute a single fuel cell 401. As described above, each electrode 10 consists of a metal sheet 11 defining holes 14 (not shown in FIG. 4) and with a non-perforated margin 15, and with a gas diffusion layer 16. In this example the non-perforated margin 15 extends to the periphery of the plates 402, 403 and 404; the gas diffusion layers 16 extend to near the edge of the through-aperture 408, and the edges of the gas diffusion layers 16 lie between peripheral solid portions of the plates 402 and 404.

A sealing material (not shown) is provided between the components forming the stack 400. In FIG. 4 this sealing material is between the solid portion of the plate 402 and the margin 15 of the left-hand electrode 10; between the left-hand electrode 10 and the plate 403; between the plate 403 and the right-hand electrode 10; and between the right-hand electrode 10 and the solid portion of the plate 404.

A thin web 410 is integral with the plate 403 and projects inwardly into the electrolyte chamber 408 around the entire periphery of the plate 403. A resilient seal 412 is moulded along almost the entire length of the web 410, but leaving narrow gaps at positions along its length where electrolyte is required to enter or leave the chamber 408. These gaps are typically less than 10 mm wide, and preferably less than 5 mm wide, but usually at least 0.5 mm wide, for example 1 mm or 2 wide. When the components of the cell 401 are compressed together, the seal 412 clamps the edge portions of the gas diffusion layers 16 onto the metal sheets 11 of the electrodes 10.

In a modification the seal 412 is integral with the web 410, and is made from the same hard plastic material as the web 410. In this case the seal 412 may be slightly smaller than if it is of resilient material. The seal 412 holds the edges of the gas diffusion layers 16 onto the metal sheets 11, and the gas diffusion layers 16 are sufficiently compliant and resilient to ensure the seal 412 holds the edges securely.

The cell stack 400 operates in substantially the way described above. In this case the edge of the gas diffusion layer 16 is exposed to electrolyte, but it is held or clamped firmly on to the metal sheet 11 by the seal 412, which ensures it does not come apart from the metal sheet 11 during use.

Although the gas chambers defined in the plates 402 and 404 are shown as through-apertures, it will be appreciated that instead they may be recesses defined in the faces of the plates 402 and 404, equivalent to the recesses 307 and 309 in the cell stack 300.

What is claimed:

1. A liquid electrolyte fuel cell with means to define an electrolyte chamber, and comprising two electrodes, one electrode on either side of the electrolyte chamber, each electrode comprising:
    a sheet of metal through which are defined a multiplicity of through-holes, and
    a fluid-permeable coherent layer of fibrous and particulate electrically-conductive material comprising carbon and a hydrophobic polymer binder, the layer defining a first surface and a second surface at opposite faces of the layer, the first surface of the layer being bonded to the sheet of metal, in electrical contact with the sheet of metal, and
    with a coating that comprises catalytic material on the second surface of the fluid-permeable layer, the coating being at least partly hydrophilic.

2. A fuel cell as claimed in claim 1 wherein the through-holes are defined by etched or drilled holes.

3. A fuel cell as claimed in claim 1 wherein the holes are of width between 5 μm and 3 mm, and are spaced between 50 μm and 10 mm apart.

4. A fuel cell as claimed in claim 1 wherein the holes occupy less than 50% of the area of the metal sheet.

5. A fuel cell as claimed in claim 1 wherein the thickness of the fluid-permeable coherent layer is equal to at least half the mean separation between the holes through the metal sheet.

6. A fuel cell as claimed in claim 1 wherein the sheet of metal has a peripheral margin without through-holes, and the fluid-permeable coherent layer extends onto the peripheral margin.

7. A fuel cell as claimed in claim 1 wherein the fluid-permeable coherent layer comprises carbon nanotubes, buckyballs or nanohorns.

8. A fuel cell as claimed in claim 1 wherein the fluid-permeable coherent layer comprises superimposed layers which differ in their carbon components and/or their hydrophobic properties.

9. A fuel cell as claimed in claim 1 wherein surfaces within the holes are provided with a hydrophobic coating.

10. A fuel cell as claimed in claim 1 wherein the fluid-permeable coherent layer is bonded to the sheet of metal by a polymer.

11. A fuel cell as claimed in claim 1 wherein the fluid-permeable coherent layer is bonded to the sheet of metal by an amorphous ceramic.

12. A fuel cell as claimed in claim 1 also comprising means to hold an edge region of the fluid-permeable coherent layer onto the metal sheet.

13. An electrode comprising:
    a sheet of metal through which are defined a multiplicity of through-holes, and
    a fluid-permeable coherent layer of fibrous and particulate electrically-conductive material comprising carbon and a hydrophobic polymer binder, the layer defining a first surface and a second surface at opposite faces of the layer, the first surface of the layer being bonded to the sheet of metal, in electrical contact with the sheet of metal, and
    with a coating that comprises catalytic material on the second surface of the fluid-permeable layer, the coating being at least partly hydrophilic.

* * * * *